(12) United States Patent
Blair

(10) Patent No.: US 7,110,395 B1
(45) Date of Patent: Sep. 19, 2006

(54) METHOD AND APPARATUS FOR NETWORK TELEPHONY

(75) Inventor: Dana Lynn Blair, Alpharetta, GA (US)

(73) Assignee: Cisco Technology, Inc., San Jose, CA (US)

(*) Notice: Subject to any disclaimer, the term of this patent is extended or adjusted under 35 U.S.C. 154(b) by 613 days.

(21) Appl. No.: 09/703,296

(22) Filed: Oct. 31, 2000

(51) Int. Cl.
*H04L 12/66* (2006.01)

(52) U.S. Cl. .................... 370/356; 379/142.13
(58) Field of Classification Search ......... 370/351–356
See application file for complete search history.

(56) References Cited

U.S. PATENT DOCUMENTS

| | | | |
|---|---|---|---|
| 4,903,260 A | 2/1990 | Boettle et al. | |
| 5,347,516 A | 9/1994 | Yoshida | |
| 5,625,676 A * | 4/1997 | Greco et al. | 379/88.14 |
| 5,805,587 A * | 9/1998 | Norris et al. | 370/352 |
| 5,995,606 A * | 11/1999 | Civanlar et al. | 379/207.13 |
| 6,144,667 A * | 11/2000 | Doshi et al. | 370/401 |
| 6,377,570 B1 * | 4/2002 | Vaziri et al. | 370/352 |
| 6,424,647 B1 * | 7/2002 | Ng et al. | 370/352 |
| 6,463,053 B1 * | 10/2002 | Chen | 370/352 |
| 6,590,869 B1 * | 7/2003 | Beyda et al. | 370/248 |
| 6,614,786 B1 * | 9/2003 | Byers | 370/353 |
| 6,636,508 B1 * | 10/2003 | Li et al. | 370/389 |
| 6,650,901 B1 * | 11/2003 | Schuster et al. | 379/45 |
| 6,671,272 B1 | 12/2003 | Vaziri et al. | 370/352 |
| 6,763,020 B1 * | 7/2004 | Hon | 370/356 |
| 2002/0181670 A1 * | 12/2002 | Myers et al. | 379/88.13 |
| 2003/0108172 A1 * | 6/2003 | Petty et al. | 379/142.08 |

FOREIGN PATENT DOCUMENTS

| | | |
|---|---|---|
| CA | 2265776 | 4/1998 |
| EP | 0 732 835 | 9/1996 |
| EP | 1 014 632 | 6/2000 |
| GB | 2283154 | 4/1995 |
| WO | WO 90/12466 | 10/1990 |
| WO | WO 95/25407 | 9/1995 |

(Continued)

OTHER PUBLICATIONS

Draft ITU-T Recommendation H.323 entitled "Visual Telephone Systems and Equipment for Local Area Networks which Provide a Non-Guaranteed Quality of Service", SG15 Plenary May 28, 1996.

(Continued)

*Primary Examiner*—Steven Nguyen
*Assistant Examiner*—Clemence Han
(74) *Attorney, Agent, or Firm*—Marger Johnson & McCollom, P.C.

(57) ABSTRACT

A method for converting a public switched telephone network call to a data network call. In one approach, the method includes receiving the public switched telephone network call from an origination phone at a destination phone and then identifying a caller identifier for the public switched telephone network call. The call is then rejected and a call placed to a network service provider. Once connected to the network, the network address for the origination phone is determined and the call is completed across the data network. Alternatively, a PSTN call is placed from an origination phone to a destination phone. The origination phone detects a rejected call from the destination phone and places a call to a network service provider. Once connected to the network, the network address for the destination phone is determined and the call is completed across the data network. A network phone capable of acting as either a destination phone or an origination phone is also discussed.

20 Claims, 2 Drawing Sheets

FOREIGN PATENT DOCUMENTS

| | | |
|---|---|---|
| WO | WO 95/31060 | 11/1995 |
| WO | WO 97/18665 | 5/1997 |
| WO | WO 9811704 A2 * | 3/1998 |
| WO | WO 9837665 A1 * | 8/1998 |

OTHER PUBLICATIONS

Nakamura Y. et al.: "On a Hybrid Network System of Circuit Switching and Packet Switching", *The Transactions of the IECE of Japan*, vol. E 65, No. 6, Abstracts.

Low C. et al.: "WEBIN - an Architecture for Fast Deployment of In-Based Personal Services", Workshop Record, Intelligent Network, Freedom and Flexibility: Realising the Promise of Intelligent Network Services, p. 1-12, Apr. 21, 1996, XP002043670.

Babbage R. et al.: "Internet Phone—Changing the Telephony Paradigm?", BT Technical Journal, vol. 15, No. 2, Apr. 1997, p. 145-157, XP000676853.

Verified translation of EP 1014632 submitted to the United Kingdom Patent Office.

* cited by examiner

METHOD AND APPARATUS FOR NETWORK TELEPHONY

BACKGROUND

1. Field

This disclosure relates to voice over data network calling, more particularly to voice over data network calling that does not require an out of band communication to connect.

2. Background

The ability to make phone calls across data networks has become more prevalent. The technique is typically referred to as Voice over IP (Internet Protocol), Voice over FR (Frame. Relay), or Voice over ATM (Asynchronous Transfer Mode), as examples. Generally, these technologies will be referred to as Voice over X (VoX).

Typically, when two users want to communicate using VoX, they make arrangements in another medium to connect the VoX call. They have to contact each other 'out of band,' meaning that they need some other way to communicate prior to making the VoX call. They may send each other an e-mail, fax or phone call using PSTN (public switched telephone network) to arrange the VoX call.

Once the call is arranged, the phone call can be initiated in a number of ways. In a first example, the users are both already connected to the network before the call is connected. In another, one user is connected to the network and initiates the call through the network. The network then has to convert the VoX call data back to voice and initiate a PSTN dialout from the network to the destination phone. Alternatively, the destination phone has to have a preassigned network address, allowing the caller to identify the phone by its address. Another alternative is to have the phone permanently connected to the network, so it can always be contacted across the network.

None of these solutions are optimal for wide spread use of network calling. The arrangements to connect by VoX make the VoX call redundant and eliminate the cost savings available by using bandwidth for which payment has already been made. PBX servers must be available for the network to perform dialing out of the network to make contact with the PSTN. Preassigned network addresses are not usually scaleable, limiting the number of devices that can be on network hubs, as well as being wasteful of unused or little used addresses. Finally, permanently connecting phones to the network is more expensive and again does not capitalize on the advantages of network calling.

SUMMARY

One embodiment is a method for converting a public switched telephone network call to a data network call. A PSTN call is received and identified prior to the call being completed. The call is rejected and a call is placed to a network service provider by the destination phone. Once connected to the network the destination phone connects to a server or site that allows the destination phone to identify the network address of the origination phone. Once it is identified, the call is completed by sending packets directly between the two phones.

Another embodiment originates a PSTN call to a destination phone. When the call is rejected, the origination phone places a call to a service provider that allows the origination phone to connect to the network. Once connected, the origination phone connects to a server or site that allows the origination phone to identify the network address of the destination phone. Once the address is known, the call is completed by sending packets directly between the two phones.

Another embodiment is a network phone that includes a connector that allows the phone to connect to a PSTN and a data network. The network phone includes a detector to detect a call identifier, as well as a transmitter to send a call identifier on an originating call. A processor in the phone is configured to either originate a call or receive a call.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
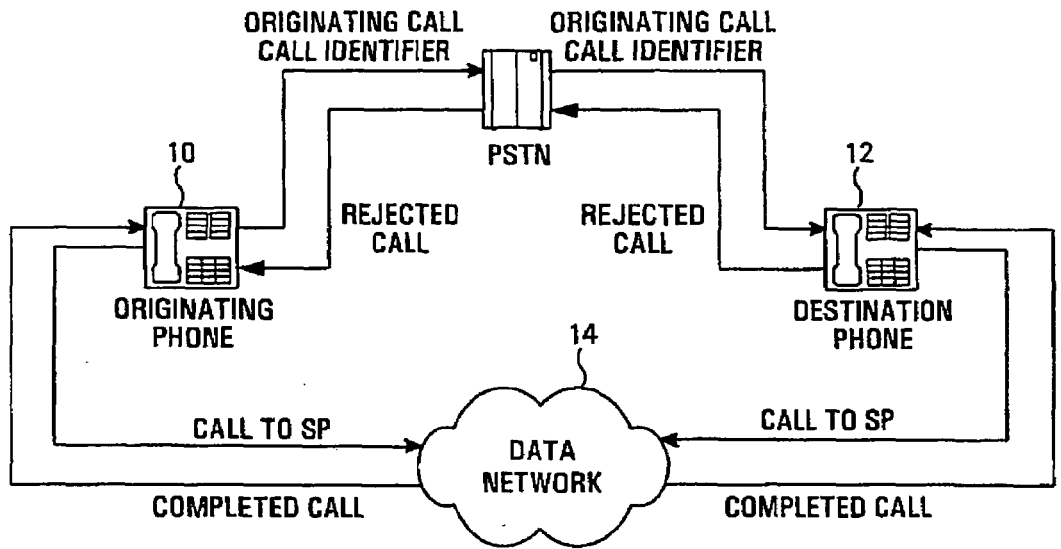
FIG. 1 shows one embodiment of a public switched telephone network call being converted to a data network call.

FIG. 1 shows two phones making a public switched telephone network (PSTN) call that is converted to a data network call. PSTNs provide telephone services in most homes. PSTN typically refers to an analog call being made over standard copper wires, but in this instance it will be used to refer to any telephone calls made using public telephone networks.

A user desires to make a network call. The user picks up the origination phone 10 and places an origination call to the destination phone 12. The term phone as used here may include a computer with a modem, microphone, speaker and a network dial up connection to a network service provider, which will be referred to as a personal computer. It may also include a standard telephone customized to include the necessary software to perform the methods of the invention, which will be referred to as a customized telephone. The origination call will go through the PSTN to the destination phone. As part of the call, a call identifier will be sent along with the call signal. An example of a call identifier is caller ID, available in many residential areas.

The destination phone 12 receives the call identifier prior to the call being completed, indicated by alerting or ringing the user at the destination, and rejects the call. The destination phone recognizes the call identifier as coming from a phone that can connect over a data network, such as IP, FR or ATM. The rejected call signal is returned to the origination phone 10. While the rejected call signal is being sent to the origination phone 10, the destination phone 12 places a call to a network service provider. When the origination phone 10 receives the rejected call signal, it also places a call to a network service provider.

The two phones do not need to use the same network service provider. They need to be able to connect to a server or site known to the phones where they can connect a data network call. The phone will inform the service provider of the location when it makes connection to the service provider. Once both of the phones are connected to the same server or site, they discover the network address of each other. When each phone knows the addresses, data packets are sent directly to each phone across the network.

In this manner, a PSTN call can be converted to a data network call. It affords the users the ability to make any type of call, local, long-distance or toll-free, using only a local phone call. The assignment of addresses is done dynamically, allowing better scalability and more efficient use of network addresses. Further, there is no requirement for the network to place a call by dialing out of the network.

Figure 2:
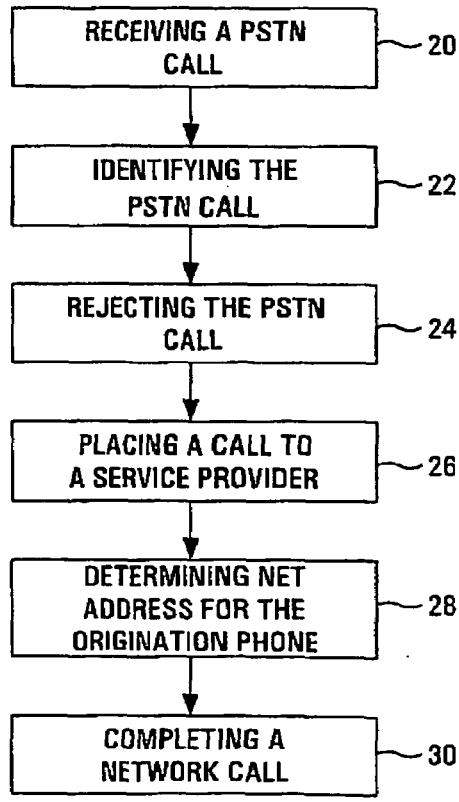
FIG. 2 shows a flow chart of one embodiment of a method of converting an outgoing public switched telephone network call to a network call.

One embodiment of a method for converting a PSTN call to a data network call at the receiving end is shown in FIG. 2. At 20, a PSTN call is received. The call is not completed, so as to avoid any long-distance charges, the call identifier is received and the call identified at 22 as being one that can be completed over a data network. The destination phone then rejects the call at 24. After rejecting the call, the destination phone then places a call to a service provider at 26.

When the call to the service provider is completed, the destination phone then connects to a server or site that allows it to discover the identity of the origination phone at 28. This can be done by sending the PSTN phone number of either the destination or origination phone and having the origination phone respond. The message could be a "here I am" message with the phone number of the destination phone, or a "I am looking for" message with the phone number of the origination phone. Other means of the phones discovering each other's network addresses are also possible. In the two examples above, the PSTN phone number acts as an identifier of which both phones have prior knowledge.

Once the two phones have identified themselves, they can direct packets to each other directly using the network addresses. This completes the network call at 30. At this point, a PSTN call has been converted to a data network call at the destination phone.

Figure 3:
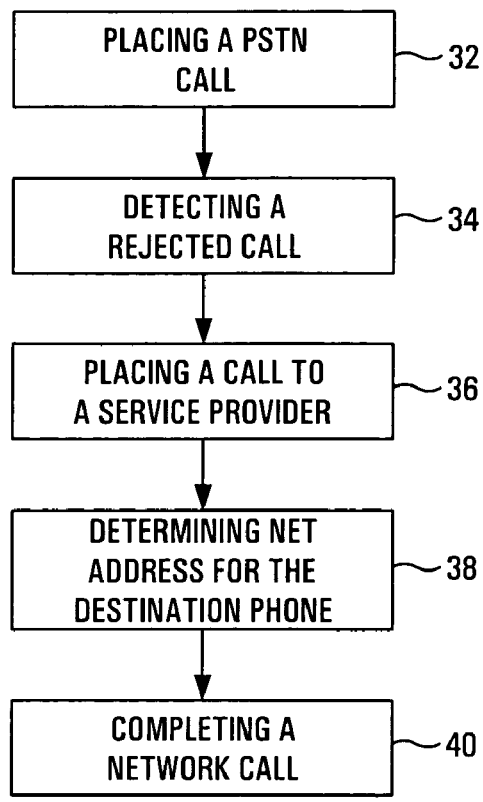
FIG. 3 shows a flow chart of one embodiment of a method of converting an incoming public switched telephone network call to a network call.

A method for converting a PSTN call to a data network call at the originating end is shown in FIG. 3. At 32, the origination phone places a PSTN call to the destination phone. When the destination phone rejects the call, the origination phone detects the rejected signal at 34. The origination phone then places a call to a service provider at 36. The origination phone then discovers the network address for the destination phone at 38, in a manner as discussed above. The call is then completed at 40.

The origination phone and destination phone could be one of several different configurations. As mentioned above, the phone may be a computer with a microphone, speaker, modem and a dial up to a network provider. Alternatively, the computer may be resident on a local area network. While this does not capitalize on the ability to have phones not permanently connected to the network, one of the phones may have the ability to contact the service provider without placing a PSTN call. The call in this instance would be through a connection over a network.

In some instances the capabilities of the invention may be provided to the phones as software. The software would more than likely be distributed to users as some sort of computer readable medium. The medium would contain software instructions that, when executed, would allow the user to implement the methods of the invention.

Figure 4:
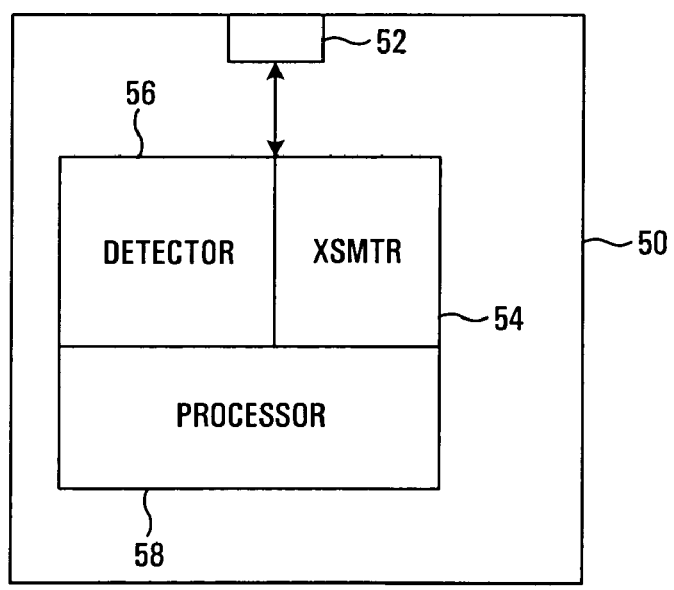
FIG. 4 shows one embodiment of a network phone.

The phone, whether it is a computer or a customized phone capable of having the software installed in it, will be referred to as a network phone. FIG. 4 shows a block diagram of one embodiment of a network phone in accordance with the invention. The phone 50 will have a connector 52 that allow connection via PSTN. In the example of a computer, this connect will more than likely be a phone jack. In the example of a computer that also has a persistent network connection, the connector may be an Ethernet card. It may also have both types of connectors.

In communication with the connector 52 is a detector 56 that can detect and decode a call identifier for when the network phone receives a call to be converted. In order to act as an origination phone, the phone will also have a transmitter 54 that transmits a call identifier. Both of these components may be part of the processor 58. The processor 58 will have a memory and be configured to perform the necessary steps of converting either an incoming or outgoing call to a data network call.

Thus, although there has been described to this point a particular embodiment for a method and apparatus for converting a PSTN call to a network call, it is not intended that such specific references be considered as limitations upon the scope of this invention except in-so-far as set forth in the following claims.

What is claimed is:

1. A method for converting a public switched telephone network call to a data network call, the method comprising:
   receiving the public switched telephone network call from an origination phone at a destination phone;
   identifying a caller identifier for the public switched telephone network call at the destination phone as the identifier of a call capable of connecting over a data network;
   automatically rejecting the public switched transmission call prior to alerting a user at the destination phone by transmitting a rejection signal generated by the destination phone to the origination phone;
   placing a call to a network service provider from the destination phone;
   determining a network address for the origination phone; and
   completing a network call with the origination phone.

2. The method of claim 1 wherein the destination phone is a personal computer.

3. The method of claim 1 wherein the destination phone is a customized telephone.

4. The method of claim 1 wherein the call to the network service provider is made via PSTN.

5. The method of claim 1 wherein the call to the network service provider is made via a local area network.

6. A method for converting a public switched telephone network call to a data network call, the method comprising:
   placing a public switched telephone network call from an origination phone to a destination phone such that the call includes a call identifier identifying the origination phone as capable of connecting over a data network;
   detecting a rejected call from the destination phone at the origination phone prior to alerting a user at the destination phone by detecting a rejection signal generated by the destination phone;
   automatically placing a call to a network service provider from the origination phone in response to the rejection signal;
   determining a network address for the destination phone; and
   completing a network call with the destination phone.

7. The method of claim 6 wherein the origination phone is a personal computer.

8. The method of claim 6 wherein the origination phone is a customized telephone.

9. The method of claim 6 wherein the call to the network service provider is made via PSTN.

10. The method of claim 6 wherein the call to the network service provider is made via a local area network.

11. A network phone, comprising:
 a phone connector operable to connect to a public switched telephone network;
 a transmitter operable to transmit signals corresponding to a phone number for a call destination and a call identifier identifying the other station as capable of connecting over a data network;
 a detector operable to receive an incoming call from another station and detect supplementary signals associated with that call including the call identifier identifying the other station as capable of connecting over a data network;
 a processor operable to:
  generate and transmit a rejection signal to the other station prior to alerting a user;
  place a public switched telephone network call to a service provider in response to the supplementary signals;
  detect a network address for the other station; and
  complete a network call between the network phone and the other station.

12. The network phone of claim 11, wherein the network phone is a personal computer.

13. The network phone of claim 11, wherein the network phone is a customized telephone.

14. A computer-readable medium containing software code that, when executed, causes a destination phone to:
 receiving a public switched telephone network call from an origination phone;
 identifying a caller identifier for the public switched telephone network call at the destination phone as a call capable of being completed over a data network;
 rejecting the public switched transmission call prior to call completion, by generation and transmission of a rejection signal to the origination phone prior to alerting a user;
 placing a call to a network service provider after transmission of the rejection signal;
 determining a network address for the origination phone; and
 completing a network call with the origination phone.

15. The computer-readable medium of claim 14 wherein the software code is executed by a personal computer equipped to place public switched telephone network calls.

16. The computer-readable medium of claim 14 wherein the software code is executed by a customized telephone.

17. A computer-readable medium containing software code that, when executed, causes an origination phone to:
 placing a public switched telephone network call to a destination phone;
 detecting a rejected call from the destination phone transmitting prior to alerting a user by detecting a rejection signal generated by the destination phone;
 automatically placing a call to a network service provider in response to the rejection signal;
 determining a network address for the destination phone; and
 completing a network call with the destination phone.

18. The computer-readable medium of claim 17 wherein the software code is executed by a personal computer equipped to place public switched telephone network calls.

19. The computer-readable medium of claim 17 wherein the software code is executed by a customized telephone.

20. A network phone, comprising:
 a means for connecting to a public switched telephone network;
 a means for transmitting signals corresponding to a phone number for a call destination and a call identifier identifying the call as being capable of being connected over a data network;
 a means for receiving an incoming call from another station and detect supplementary signals associated with that call including the call identifier identifying the call as being capable of being connected over a data network;
 a means for generating and transmitting a rejection signal to the other station prior to alerting a user;
 a means for placing a public switched telephone network call to a service provider in response to the supplementary signals;
 a means for detecting a network address for the other station; and
 a means for completing a network call between the network phone and the other station.

* * * * *